Figure 1:
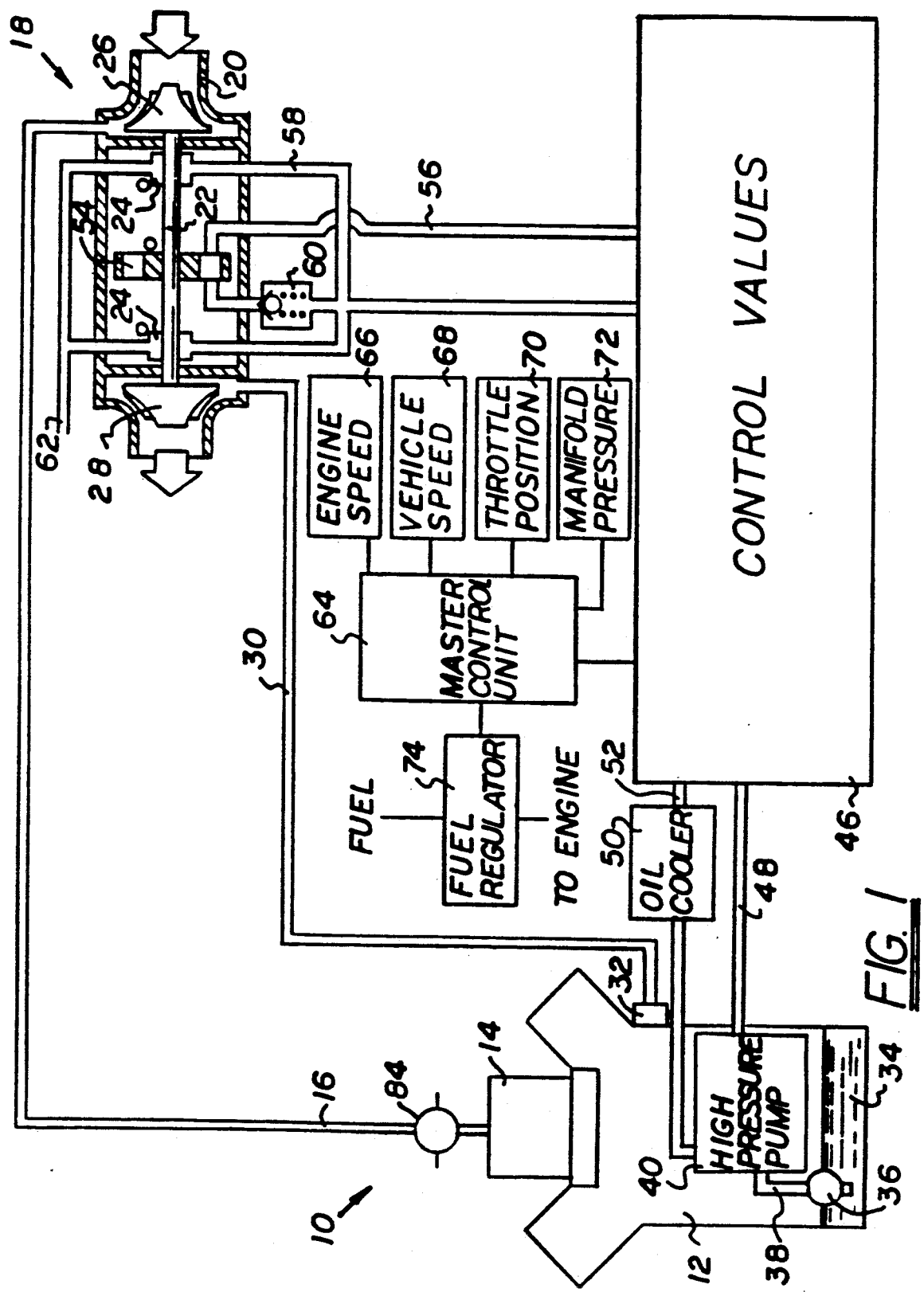

United States Patent [19]
Adeff

[11] Patent Number: 5,076,060
[45] Date of Patent: Dec. 31, 1991

[54] CONTROL LOGIC FOR EXHAUST GAS DRIVEN TURBOCHARGER

[75] Inventor: George A. Adeff, Los Angeles, Calif.
[73] Assignee: Allied-Signal Inc., Morristown, N.J.
[21] Appl. No.: 519,059
[22] Filed: May 4, 1990
[51] Int. Cl.⁵ .......................................... F02B 37/14
[52] U.S. Cl. ............................................. 60/608
[58] Field of Search ............................ 60/607, 608

[56] References Cited

U.S. PATENT DOCUMENTS

| | | |
|---|---|---|
| 3,927,530 | 12/1975 | Braun .................................. 60/607 |
| 4,622,817 | 11/1986 | Kobayashi ........................... 60/608 |
| 4,981,017 | 1/1991 | Hara et al. ........................... 60/608 |

FOREIGN PATENT DOCUMENTS 233079 8/1987 European Pat. Off. .
311457 4/1989 European Pat. Off. .

OTHER PUBLICATIONS

Patent Abstract, Japan 62-276221, Omichi, 12 Dec. 1987.

*Primary Examiner*—Leonard E. Smith
*Attorney, Agent, or Firm*—Ken C. Decker; William N. Antonis

[57] ABSTRACT

A hydraulic assisted turbocharger provides charge air to the intake manifold of a vehicle internal combustion engine. The hydraulic assist can be selectively turned on by the vehicle operator when the vehicle is stopped or is traveling at a low speed so that charge air can be supplied to the engine immediately upon a subsequent acceleration.

7 Claims, 2 Drawing Sheets

CONTROL LOGIC FOR EXHAUST GAS DRIVEN TURBOCHARGER

This invention relates to turbochargers for internal combustion engines powering automotive vehicles; and, more particularly, to a method of operating a turbocharger in a manner substantially improving vehicle performance (including the control of exhaust gas emissions).

Turbochargers are commonly used for supplying a charge of air under pressure to an internal combustion engine. Turbochargers include a turbine wheel and a compressor wheel mounted on a common shaft within a housing. Engine exhaust gases are communicated through the turbine wheel, which turns the shaft to rotate the compressor wheel to compress ambient air. The compressed charge air is communicated to the engine induction manifold. However, turbochargers are unable to provide the engine with sufficient charge air during some operating conditions, such as low engine speed or transient load demand operation. Accordingly, when a vehicle equipped with a turbocharger is accelerated from idle, the improved engine response due to charge air is delayed (so-called "turbo lag") until the energy of the exhaust gasses is sufficient to accelerate the compressor wheel into a range in which sufficient charge air can be generated. Furthermore, during low speed engine lugging conditions, the turbocharger for similar reasons is unable to provide sufficient charge air to improve engine performance to an acceptable degree.

For this reason, it has been proposed to improve turbocharger performance by providing a hydraulic turbine wheel on the turbocharger shaft which supplements the exhaust gas driven turbine wheel during the low engine speed or transient load demand operations. Accordingly, high pressure hydraulic oil is communicated to the hydraulic turbine wheel during predetermined engine operating conditions to thereby switch the turbocharger into a low speed power driving mode, in which the shaft upon which the compressor wheel is mounted is driven by the hydraulic turbine until the energy of the exhaust gas is sufficient to drive the compressor wheel at speeds sufficient to provide the necessary quantity of charge air.

Another way in which turbocharger performance can be improved at low engine speed or transient load demand conditions is to provide a variable area inlet to the turbine wheel. This variable area nozzle input can be adjusted during low speed or transient load demand engine operation to decrease the nozzle area and thereby increase the full velocity of the exhaust gasses, to thereby more quickly drive the turbine wheel to rotational speeds at which the compressor wheel is capable of generating the necessary quantity of charge air. Although the following invention will be described with reference to a three-wheel turbocharger in which supplemental driving is provided by a hydraulic turbine wheel, the invention is also applicable to other types of turbochargers, such as variable nozzle area turbochargers, in which the turbocharger can be reset to a power mode by approximately setting the nozzle area, or turbochargers in which supplemental driving is provided by an electric motor or high pressure pneumatic drive.

Accordingly, the present invention permits the vehicle operator to selectively preset the turbocharger into a mode in which maximum boost can be generated at low engine speeds or during engine acceleration, instead of turning on the hydraulic boost every time the engine is at idle condition. By selectively providing hydraulic assist instead of always turning on hydraulic assist at engine idle, the disadvantages of increased noise and load on the engine and, in case when the engine is idled for long periods of time, excessively high oil temperatures are avoided and compressor surge noise is avoided.

Since the present invention permits the vehicle operator to preset the turbocharger under low speed conditions to obtain maximum power on a subsequent acceleration, if the vehicle operator decides that maximum power is not necessary on a subsequent acceleration, he does not set the turbocharger into the maximum power mode. If the turbocharger has been set to the power mode under engine idle or low engine speed conditions and an acceleration does not occur within a predetermined time period, the turbocharger is automatically reset to the normal mode in which the hydraulic assist is turned off.

Figure 2:
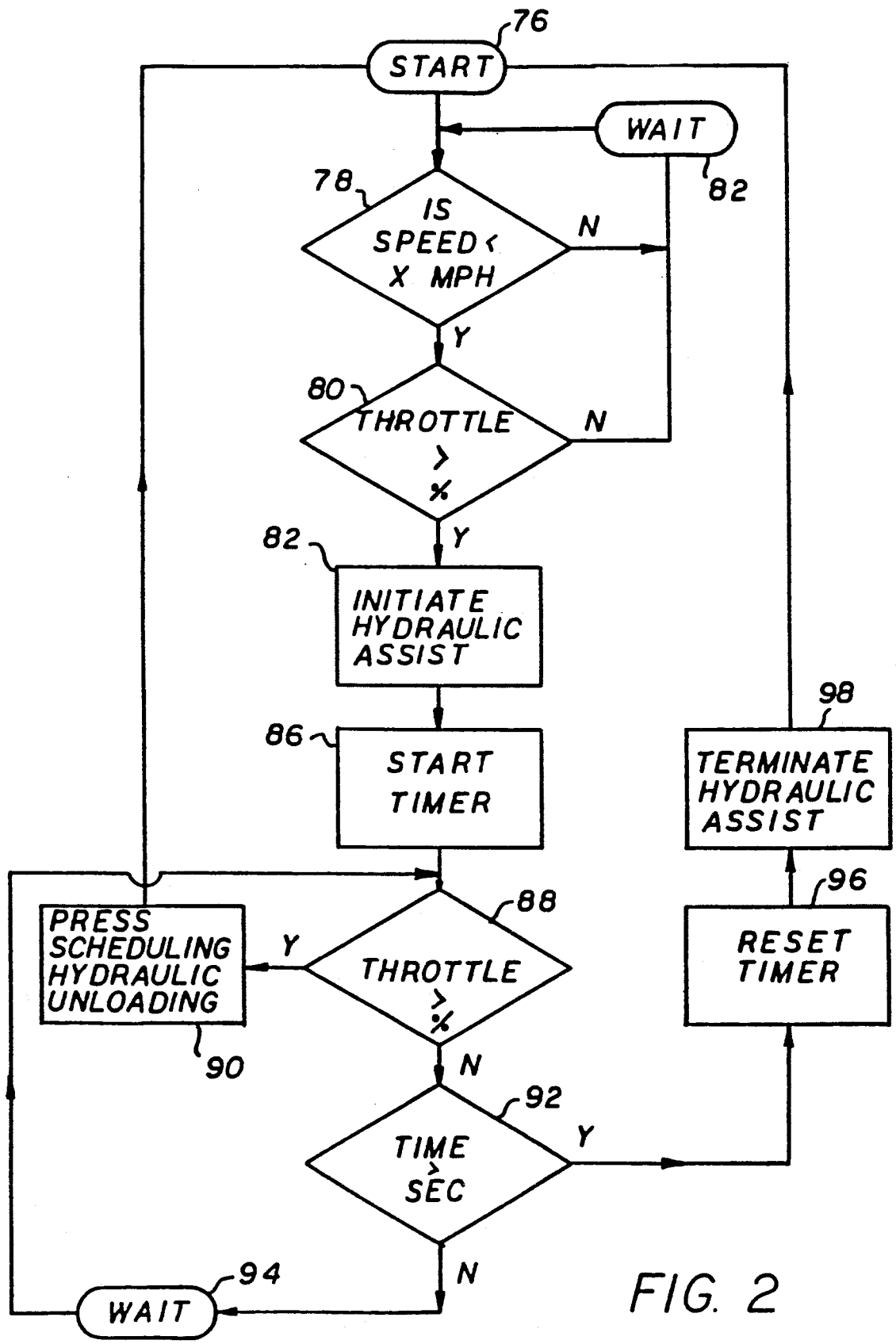

These and other advantages of the present invention will become apparent from the following description, with reference to the accompanying drawing, in which FIG. 1 is a schematic illustration of a vehicle engine, hydraulic control, and turbocharger system made pursuant to the teachings of the present invention; and FIG. 2 is a diagrammatic illustration of the sequence of program steps in which the turbocharger and control system illustrated in FIG. 1 is operated under certain engine and vehicle operating conditions.

Referring to FIG. 1 of the drawings, a vehicle engine and turbocharger system generally indicated by the numeral 10 includes a engine 12 having an induction manifold 14 which is supplied with charge air through conduit 16 from a turbocharger generally indicated by the numeral 18. Turbocharger 18 comprises a housing 20 within which a turbocharger shaft 22 is rotatably supported on bearings indicated diagrammatically at 24. The shaft 22 mounts a compressor wheel 26 on one end thereof, and the conduit 16 communicates with the high pressure side of the compressor wheel 26 in a manner well known to those skilled in the art. A turbine wheel 28 is mounted on the opposite end of the shaft 22, and a conduit 30 communicates exhaust gas from exhaust manifold 32 of the engine 12 to the turbocharger turbine wheel 28.

Engine 12 includes an oil sump 34 which receives lubricating oil for lubricating the various internal components of the engine 12. Engine 12 also includes an oil pump 36 of a standard design which pumps oil from the sump 34 into intermediate conduit 38 where the oil is communicated to the various internal components of the engine 12 requiring lubrication. The inlet of a high pressure pump 40 is communicated to the outlet of the pump 36, and the outlet of pump 40 is communicated to control valves indicated diagrammatically at 46 through outlet conduits 48. Oil is returned to the sump 34 from the control valves 46 through an oil cooler 50 in return conduit 52. The control valves 46 control communication from the high pressure pump 40 to a hydraulic turbine wheel 54 mounted on the turbocharger shaft 22 between the turbine wheel 28 and the compressor wheel 26. Control valves 46 control communication to the turbine wheel 54 through outlet conduit 56, and also control communication to the bearings 24 to provide lubrication therefore through conduit 58. A check valve 60 permits fluid to return to the bearings 24 after it is Passed through the turbine wheel 54. The oil is returned to the sump 34 through return line 62.

The design and operation of the control valves 46 is more completely described in U.S. Pat. No. 4,622,817. More specifically, this patent discloses, in FIG. 9 thereof, a mode selector valve which controls communication to the turbine wheel 54, a control valve which assures communication of lubricating oil to the bearing 24 and also controls unloading of the hydraulic turbine wheel 54 in response to increased pressure generated by the compressor wheel 26. Control valves 46 further include a solenoid actuated valve which controls both the selector valve and the control valve. The solenoid operated valve is under the control of the vehicle master control unit 64. The master control unit 64 is a programmable electronic control module of the type well known to those skilled in the art for scheduling fuel flow to combustion engines. Alternatively, a single purpose controller may be programmed to control only the hydraulic assist to the turbocharger. The master control unit 64 receives inputs such as engine speed indicated at 66, vehicle speed indicated at 68, throttle position indicated at 70, and boost pressure as indicated at 72, and processes this information to control a fuel regulator 74, which controls flow of fuel to the engine 12. Although not shown in the drawing, inputs from the brake pedal and automatic transmission may also be provided if the controller is programmed to prevent "stall" operation. The master control unit 64 is also connected to the aforementioned solenoid control valve within the control valve assembly 46. This control valve 95, is more completely described in the aforementioned U.S. Pat. No. 4,622,817, controls the aforementioned mode selection valve to control the hydraulic turbine wheel 54. Alternatively, the controller may provide a signal to turn on or off the pump 40, if it is driven by an electric motor. More particularly, the master control unit may include a boost scheduling control which causes the control valves 46 to control the turbocharger 18 in a way to schedule the charge pressure.

According to the present invention, the master control unit 64 is also programmed with a subroutine to permit the vehicle operator, under certain predetermined conditions, to switch the turbocharger 18 into a power mode in which the hydraulic assist provided by the hydraulic turbine wheel 54 is turned on. Accordingly, on a subsequent acceleration, charge air is immediately available to the engine 12 in quantities sufficient to substantially improve engine power and performance, thereby eliminating the lag associated with prior art turbochargers. The subroutine causes the master control unit 64 to respond to the vehicle speed input 68 and throttle position input 70 in such a way to provide hydraulic assist to the hydraulic turbine 54. The throttle position signal is generated in a way well known to those skilled in the art by providing a position transducer on the vehicle accelerator pedal, or on the throttle shaft or throttle linkage. If the engine is a diesel engine, the transducer can sense fuel rack position or the position of the fuel control linkage. The subroutine is illustrated diagrammatically in FIG. 2.

Referring to FIG. 2, after the subroutine illustrated in FIG. 2 is started as indicated at 76, the vehicle speed signal 68 is monitored as indicated at 78 to determine if vehicle speed is less than a predetermined speed, such as, for example, 5 miles per hour. Accordingly, it is desirable to permit the vehicle operator to control hydraulic assist of the turbocharger 18 only under low speed conditions. If the vehicle speed is less than the predetermined minimum miles per hour, the throttle position sensor 70 is monitored, as indicated at 80, to determine if the throttle or accelerator pedal has been depressed at least a certain percentage of full accelerator pedal travel. Accordingly, before proceeding through step 80, the subroutine assures that both the vehicle speed is less than a predetermined speed and the throttle pedal or accelerator pedal has been depressed and released to a predetermined maximum position. If neither of these occurrences exist, the program waits a predetermined, relatively short cycle time as indicated at 82 before again monitoring these two inputs.

If the accelerator pedal has been depressed and released while the speed of the vehicle is less than the predetermined mile per hour, hydraulic assist to the hydraulic turbine wheel 54 is initiated, as indicated at 83. Accordingly, the turbocharger 18 begins to generate charge air in the conduit 16, even though exhaust gasses communicated to the turbine wheel 28 are at low energy, because the turbocharger 18 has been placed in the power mode by communicating hydraulic assist to the hydraulic turbine wheel 54. Although charge air is present in the conduit 16, it is not allowed to pass into the induction manifold 14 on an air-throttled engine because the throttle valve, as indicated at 84 in FIG. 1, is closed, or nearly closed, since the vehicle is either at idle or is operating at a very low speed.

Upon initiation of hydraulic assist as indicated at 83, a timer is started as indicated at 86. The timer times for a predetermined time period, and then times out. The throttle position sensor is then monitored, as at 88, to determine if it has been depressed in excess of a predetermined percentage, which may be different from the percentage controlling block 80. When the throttle is depressed on a throttled engine, the throttle valve 84 is opened, immediately permitting charge air to flow into the induction manifold 14, so that power is immediately available from the engine 12. When this occurs, the program transfers, as indicated at 90, to the manifold pressure scheduling or the air flow scheduling the hydraulic unloading subroutine. As discussed in the aforementioned U.S. Pat. No. 4,622,817, these subroutines gradually unload the hydraulic turbine wheel 54 as exhaust gasses communicated to the exhaust gas driven turbine wheel 28 increase to make hydraulic driving of the turbocharger 18 unnecessary. The program then branches back to start at 76.

If the throttle pedal has not been depressed, the subroutine illustrated in FIG. 2 then proceeds to the decision box 92 to determine if the timer 86 has timed out. If the timer has not timed out, the program waits a predetermined, very short cycle time, as indicated at 94, and then branches back to the input to block 88. If the timer has timed out, the program resets the timer, as indicated at 96, and causes the aforementioned solenoid control valve included within the control valves 46 to terminate the hydraulic assist as indicated at 98. The program then branches back to the start box 76.

Accordingly, if the vehicle operator wishes to accelerate quickly from idle, the vehicle operator may place the turbocharger 18 in the power control mode by "blipping" the accelerator pedal, which initiates communication to the hydraulic turbine wheel 54, to thereby spin up the compressor wheel 26 to provide charge air to the engine immediately after the throttle valve 84 is subsequently opened to effect vehicle acceleration. Similarly, the turbocharger may be placed in the power mode when, for example, the vehicle is lugging up a steep hill, so that the vehicle speed has dropped below a predetermined speed level. Accordingly, the hydraulic assist is not turned on each time the engine is stopped. Furthermore, the hydraulic assist is turned off and the turbocharger restored to the normal mode after a predetermined timed period if an acceleration has not occurred.

I claim:

1. Method of controlling an exhaust gas driven turbocharger supplying charge air for an internal combustion engine powering a vehicle, said turbocharger being adjustable from a normal mode to a power mode in which the charge air available to said engine during vehicle acceleration is increased over that available when the turbocharger is in the normal mode, comprising the steps of measuring the speed of said vehicle, and adjusting said turbocharger to said power mode when the speed of said vehicle is less than a predetermined reference speed to increase the charge air available to said engine and thereby increasing engine power on a subsequent acceleration of said vehicle, said turbocharger including a compressor wheel mounted on a common shaft for rotation with an exhaust gas turbine wheel and a hydraulic turbine wheel, means for communicating exhaust gas from said engine to the exhaust gas turbine wheel, means for communicating hydraulic pressure to the hydraulic turbine wheel for driving the compressor wheel in the absence of communication of sufficient exhaust gas to the turbine wheel, said step of adjusting said turbocharger from said normal mode to said power mode including the step of communicating hydraulic pressure to said hydraulic turbine wheel.

2. Method of controlling an exhaust gas driven turbocharger supplying charge air for an internal combustion engine powering a vehicle, said turbocharger being adjustable from a normal mode to a power mode in which the charge air available to said engine during vehicle acceleration is increased over that available when the turbocharger is in the normal mode, comprising the steps of measuring the speed of said vehicle, and adjusting said turbocharger to said power mode when the speed of said vehicle is less than a predetermined reference speed to increase the charge air available to said engine and thereby increasing engine power on a subsequent acceleration of said vehicle, and resetting the turbocharger to the normal mode a predetermined time period after the turbocharger has been adjusted into the power mode if a vehicle acceleration has not occurred within said predetermined time period.

3. Method of controlling an exhaust gas driven turbocharger supplying charge air for an internal combustion engine powering a vehicle, said turbocharger being adjustable from a normal mode to a power mode in which the charge air available to said engine during vehicle acceleration is increased over that available when the turbocharger is in the normal mode, said vehicle including engine power control means switchable by the vehicle operator from a normal mode to a power mode so that the vehicle operator may selectively elect either the normal mode or the power mode, comprising the steps of measuring the speed of said vehicle, permitting the vehicle operator to elect either the power mode or the normal mode for a subsequent vehicle acceleration, and then adjusting said turbocharger to said power mode when the speed of said vehicle is less than a predetermined reference speed and the vehicle operator has elected to power mode to increase the charge air available to said engine and thereby increasing engine power on a subsequent acceleration of said vehicle.

4. Method of controlling an exhaust gas driven turbocharger as claimed in claim 3, wherein said engine power control means includes a depressible accelerator pedal of the vehicle, said step of switching the power control means to said power mode including the step of depressing the accelerator pedal by a predetermined amount and then releasing the accelerator pedal.

5. Method of controlling an exhaust gas driven turbocharger as claimed in claim 3, wherein said turbocharger includes a compressor wheel mounted on a common shaft for rotation with an exhaust gas turbine wheel and a hydraulic turbine wheel, means for communicating exhaust gas from said engine to the exhaust gas turbine wheel, means for communicating hydraulic pressure to the hydraulic turbine wheel for driving the compressor wheel in the absence of communication of exhaust gas to the turbine wheel, said step of adjusting said turbocharger from said normal mode to said power mode including the step of communicating hydraulic pressure to said hydraulic turbine wheel.

6. Method of controlling an exhaust gas driven turbocharger as claimed in claim 3, wherein said method includes the step of resetting the turbocharger to the normal mode a predetermined time period after the turbocharger has been adjusted into the power mode if a vehicle acceleration has not occurred within said predetermined timer period.

7. Method of controlling an exhaust gas driven turbocharger as claimed in claim 6, wherein said turbocharger includes a compressor wheel mounted on a common shaft for rotation with an exhaust gas turbine wheel and a hydraulic turbine wheel, means for communicating exhaust gas from said engine to the exhaust gas turbine wheel, means for communicating hydraulic pressure to the hydraulic turbine wheel for driving the compressor wheel in the absence of communication of exhaust gas to the turbine wheel, said step of adjusting said turbocharger from said normal mode to said power mode including the step of communicating hydraulic pressure to said hydraulic turbine wheel.

* * * * *